(12) United States Patent
Bergland et al.

(10) Patent No.: US 8,314,803 B2
(45) Date of Patent: Nov. 20, 2012

(54) BUFFERING DESERIALIZED PIXEL DATA IN A GRAPHICS PROCESSOR UNIT PIPELINE

(75) Inventors: Tyson J. Bergland, Palo Alto, CA (US); Craig M. Okruhlica, San Jose, CA (US); Edward A. Hutchins, Mountain View, CA (US); Michael J. M. Toksvig, Palo Alto, CA (US); Justin M. Mahan, Fremont, CA (US)

(73) Assignee: Nvidia Corporation, Santa Clara, CA (US)

( * ) Notice: Subject to any disclaimer, the term of this patent is extended or adjusted under 35 U.S.C. 154(b) by 1283 days.

(21) Appl. No.: 11/893,499

(22) Filed: Aug. 15, 2007

(65) Prior Publication Data

US 2011/0254848 A1     Oct. 20, 2011

(51) Int. Cl.
G06F 15/80 (2006.01)
G06T 1/20 (2006.01)
G09G 5/36 (2006.01)

(52) U.S. Cl. .................... 345/505; 345/506; 345/559
(58) Field of Classification Search .................. None
See application file for complete search history.

(56) References Cited

U.S. PATENT DOCUMENTS

| 4,620,217 A | 10/1986 | Songer |
| 4,648,045 A | 3/1987 | Demetrescu |
| 4,700,319 A | 10/1987 | Steiner |
| 4,862,392 A * | 8/1989 | Steiner .................... 345/427 |
| 4,901,224 A | 2/1990 | Ewert |
| 5,185,856 A | 2/1993 | Alcorn et al. |
| 5,357,604 A | 10/1994 | San et al. |
| 5,392,393 A | 2/1995 | Deering |
| 5,491,496 A | 2/1996 | Tomiyasu |
| 5,577,213 A * | 11/1996 | Avery et al. .................... 710/100 |
| 5,581,721 A | 12/1996 | Wada et al. |
| 5,600,584 A | 2/1997 | Schlafly |
| 5,655,132 A | 8/1997 | Watson |
| 5,850,572 A | 12/1998 | Dierke |
| 5,941,940 A | 8/1999 | Prasad et al. |
| 5,977,977 A | 11/1999 | Kajiya et al. |
| 6,118,452 A | 9/2000 | Gannett |
| 6,173,366 B1 | 1/2001 | Thayer et al. |
| 6,333,744 B1 | 12/2001 | Kirk et al. |
| 6,351,806 B1 | 2/2002 | Wyland |

(Continued)

FOREIGN PATENT DOCUMENTS

JP         62080785 A2     4/1987

(Continued)

OTHER PUBLICATIONS

"Interleaved Memory." Dec. 26, 2002. http://www.webopedia.com/TERM/I/interleaved_memory.html.

(Continued)

*Primary Examiner* — Kee M Tung
*Assistant Examiner* — Carlos Perromat

(57) ABSTRACT

An arithmetic logic stage in a graphics processor unit pipeline includes a number of arithmetic logic units (ALUs) and at least one buffer that stores pixel data for a group of pixels. Each clock cycle, the buffer stores one row of a series of rows of pixel data. A deserializer deserializes the rows of pixel data before the pixel data is placed in the buffer. After the buffer accumulates all rows of pixel data for a pixel, then the pixel data for the pixel can be operated on by the ALUs.

20 Claims, 10 Drawing Sheets

U.S. PATENT DOCUMENTS

| | | | |
|---|---|---|---|
| 6,353,439 | B1 | 3/2002 | Lindholm et al. |
| 6,466,222 | B1 | 10/2002 | Kao et al. |
| 6,496,537 | B1 | 12/2002 | Kranawetter et al. |
| 6,526,430 | B1 | 2/2003 | Hung et al. |
| 6,557,022 | B1 | 4/2003 | Sih et al. |
| 6,624,818 | B1 | 9/2003 | Mantor et al. |
| 6,636,221 | B1 | 10/2003 | Morein |
| 6,636,223 | B1 * | 10/2003 | Morein .................. 345/581 |
| 6,778,181 | B1 | 8/2004 | Kilgariff et al. |
| 6,806,886 | B1 * | 10/2004 | Zatz .................. 345/582 |
| 6,839,828 | B2 | 1/2005 | Gschwind et al. |
| 6,924,808 | B2 | 8/2005 | Kurihara et al. |
| 6,947,053 | B2 | 9/2005 | Malka et al. |
| 6,980,209 | B1 | 12/2005 | Donham et al. |
| 6,999,100 | B1 | 2/2006 | Leather et al. |
| 7,280,112 | B1 | 10/2007 | Hutchins |
| 7,298,375 | B1 | 11/2007 | Hutchins |
| 7,477,260 | B1 * | 1/2009 | Nordquist .................. 345/560 |
| 7,659,909 | B1 | 2/2010 | Hutchins |
| 7,710,427 | B1 | 5/2010 | Hutchins |
| 7,928,990 | B2 * | 4/2011 | Jiao et al. .................. 345/557 |
| 7,941,645 | B1 * | 5/2011 | Riach et al. .................. 712/220 |
| 2002/0129223 | A1 | 9/2002 | Takayama et al. |
| 2003/0115233 | A1 | 6/2003 | Hou et al. |
| 2004/0114813 | A1 | 6/2004 | Boliek et al. |
| 2004/0130552 | A1 * | 7/2004 | Duluk et al. .................. 345/506 |
| 2005/0122330 | A1 | 6/2005 | Boyd et al. |
| 2005/0135433 | A1 * | 6/2005 | Chang et al. .................. 370/536 |
| 2005/0223195 | A1 | 10/2005 | Kawaguchi |
| 2006/0028469 | A1 | 2/2006 | Engel |
| 2006/0152519 | A1 * | 7/2006 | Hutchins et al. .................. 345/561 |
| 2006/0155964 | A1 | 7/2006 | Totsuka |
| 2006/0177122 | A1 * | 8/2006 | Yasue .................. 382/154 |
| 2007/0279408 | A1 * | 12/2007 | Zheng et al. .................. 345/213 |
| 2007/0285427 | A1 | 12/2007 | Morein et al. |

FOREIGN PATENT DOCUMENTS

| | | |
|---|---|---|
| JP | 05150979 A2 | 6/1993 |
| JP | 07084965 A2 | 3/1995 |
| JP | 11053187 A2 | 2/1999 |
| JP | 2000047872 A2 | 2/2000 |
| JP | 2002073330 A2 | 3/2002 |
| JP | 2004303026 A1 | 10/2004 |
| WO | 2005114646 A2 | 12/2005 |

OTHER PUBLICATIONS

Hennessy, et al., Computer Organization and Design: The Hardware/Software Interface, 1997, Section 6.5.

Hollasch; IEEE Standard 754 Floating Point Numbers; http://steve.hollasch.net/cgindex/coding/ieeefloat.html; dated Feb. 24, 2005; retrieved Oct. 21, 2010.

Microsoft; (Complete) Tutorial to Understand IEEE Floating-Point Errors; http://support.microsoft.com/kb/42980; dated Aug. 16, 2005; retrieved Oct. 21, 2010.

Moller, et al.; Real-Time Rendering, 2nd ed., 2002, A K Peters Ltd., pp. 92-99, 2002.

Pirazzi, Chris. "Fields, F1/F2, Interleave, Field Dominance And More." Nov. 4, 2001. http://lurkertech.com/lg/dominance.html.

* cited by examiner

| | | | | | |
|---|---|---|---|---|---|
| Sideband 420 | | | | | 1st Row of Next Quad |
| " | (I3) | P3r12 | P3r13 | P3r14 | P3r15 | Row 15 (P3R3) |
| | . | . | . | . | . | Row 8-14 |
| " | (I1) | P3r4 | P3r5 | P3r6 | P3r7 | Row 7 (P3R1) |
| " | (I1) | P2r4 | P2r5 | P2r6 | P2r7 | Row 6 (P2R1) |
| " | (I1) | P1r4 | P1r5 | P1r6 | P1r7 | Row 5 (P1R1) |
| " | (I1) | P0r4 | P0r5 | P0r6 | P0r7 | Row 4 (P0R1) |
| " | (I0) | P3r0 | P3r1 | P3r2 | P3r3 | Row 3 (P3R0) |
| " | (I0) | P2r0 | P2r1 | P2r2 | P2r3 | Row 2 (P2R0) |
| " | (I0) | P1r0 | P1r1 | P1r2 | P1r3 | Row 1 (P1R0) |
| Sideband 420 | (I0) | P0r0 | P0r1 | P0r2 | P0r3 | Row 0 (P0R0) |
| " | | | | | | Last Row of Previous Quad |

Direction of Flow

| Clock | Deser | ALUIN | ALUOUT | Ser | |
|---|---|---|---|---|---|
| 1 | P0R0 | | | | |
| 2 | P1R0 | | | | |
| 3 | P2R0 | | | | |
| 4 | P3R0 | | | | |
| 5 | P0R1 | | | | |
| 6 | P1R1 | | | | |
| 7 | P2R1 | | | | |
| 8 | P3R1 | | | | |
| 9 | P0R2 | | | | |
| 10 | P1R2 | | | | |
| 11 | P2R2 | | | | |
| 12 | P3R2 | | | | |
| 13 | P0R3 | | | | |
| 14 | P1R3 | P0R0 | | | // Since all rows of pixel 0 have been received, pixel 0 can be passed into the ALU |
| 15 | P2R3 | P1R0 | | | // Since all rows of pixel 1 have been received, pixel 1 can be passed into the ALU |
| 16 | P3R3 | P2R0 | | | |
| 17 | P0R0 | P3R0 | | | |
| 18 | P1R0 | P0R1 | P0R0 | | // 4 cycles from input to output of ALU pipeline |
| 19 | P2R0 | P1R1 | P1R0 | | |
| 20 | P3R0 | P2R1 | P2R0 | | |
| 21 | P0R1 | P3R1 | P3R0 | | |
| 22 | P1R1 | P0R2 | P0R1 | | |
| 23 | P2R1 | P1R2 | P1R1 | | |
| 24 | P3R1 | P2R2 | P2R1 | | |
| 25 | P0R2 | P3R2 | P3R1 | | |
| 26 | P1R2 | P0R3 | P0R2 | | |
| 27 | P2R2 | P1R3 | P1R2 | | |
| 28 | P3R2 | P2R3 | P2R2 | | |
| 29 | P0R3 | P3R3 | P3R2 | | |
| 30 | P1R3 | P0R0 | P0R3 | | |
| 31 | P2R3 | P1R0 | P1R3 | P0R0 | // Since all rows of pixel 0 have been operated on and written back, pixel 0 can be serialized out |
| 32 | P3R3 | P2R0 | P2R3 | P1R0 | |
| 33 | P0R0 | P3R0 | P3R3 | P2R0 | // Since all rows of pixel 1 have been operated on and written back, pixel 1 can be serialized out |
| 34 | P1R0 | P0R1 | P0R0 | P3R0 | |
| 35 | P2R0 | P1R1 | P1R0 | P0R1 | |
| 36 | P3R0 | P2R1 | P2R0 | P1R1 | |
| 37 | P0R1 | P3R1 | P3R0 | P2R1 | From Buffer 0 |
| 38 | P1R1 | P0R2 | P0R1 | P3R1 | |
| 39 | P2R1 | P1R2 | P1R1 | P0R2 | |
| 40 | P3R1 | P2R2 | P2R1 | P1R2 | |
| 41 | P0R2 | P3R2 | P3R1 | P2R2 | |
| 42 | P1R2 | P0R3 | P0R2 | P3R2 | |
| 43 | P2R2 | P1R3 | P1R2 | P0R3 | |
| 44 | P3R2 | P2R3 | P2R2 | P1R3 | |
| 45 | P0R3 | P3R3 | P3R2 | P2R3 | |
| 46 | P1R3 | P0R0 | P0R3 | P3R3 | |
| 47 | P2R3 | P1R0 | P1R3 | P0R0 | |
| 48 | P3R3 | P2R0 | P2R3 | P1R0 | |
| 49 | P0R0 | P3R0 | P3R3 | P2R0 | // Buffer 0 has been completely serialized out, so the deserializer can start overwriting it |
| 50 | P1R0 | P0R1 | P0R0 | P3R0 | |
| 51 | P2R0 | P1R1 | P1R0 | P0R1 | |
| 52 | P3R0 | P2R1 | P2R0 | P1R1 | From Buffer 1 |
| 53 | P0R1 | P3R1 | P3R0 | P2R1 | |
| 54 | P1R1 | P0R2 | P0R1 | P3R1 | |

| Clock | Deser | ALUIN | ALUOUT | Ser | |
|---|---|---|---|---|---|
| 55 | P2R1 | P1R2 | P1R1 | P0R2 | |
| 56 | P3R1 | P2R2 | P2R1 | P1R2 | From Buffer 1 |
| 57 | P0R2 | P3R2 | P3R1 | P2R2 | |
| 58 | P1R2 | P0R3 | P0R2 | P3R2 | |
| 59 | P2R2 | P1R3 | P1R2 | P0R3 | |
| 60 | P3R2 | P2R3 | P2R2 | P1R3 | |
| 61 | P0R3 | P3R3 | P3R2 | P2R3 | |
| 62 | P1R3 | P0R0 | P0R3 | P3R3 | |
| 63 | P2R3 | P1R0 | P1R3 | P0R0 | |
| 64 | P3R3 | P2R0 | P2R3 | P1R0 | |
| 65 | ... | P3R0 | P3R3 | P2R0 | |
| 66 | | P0R1 | P0R0 | P3R0 | |
| 67 | ↓ | P1R1 | P1R0 | P0R1 | From Buffer 2 |
| 68 | | P2R1 | P2R0 | P1R1 | |
| 69 | | P3R1 | P3R0 | P2R1 | |
| 70 | | P0R2 | P0R1 | P3R1 | |
| 71 | | P1R2 | P1R1 | P0R2 | |
| 72 | | P2R2 | P2R1 | P1R2 | |
| 73 | | P3R2 | P3R1 | P2R2 | |
| 74 | | P0R3 | P0R2 | P3R2 | |
| 75 | | P1R3 | P1R2 | P0R3 | |
| 76 | | P2R3 | P2R2 | P1R3 | |
| 77 | | P3R3 | P3R2 | P2R3 | |
| 78 | | ... | P0R3 | P3R3 | |
| 79 | | | P1R3 | P0R0 | |
| 80 | | ↓ | P2R3 | P1R0 | |
| 81 | | | P3R3 | P2R0 | From Buffer 0 |
| 82 | | | ... | P3R0 | |
| 83 | | | | P0R1 | |
| 84 | | | ↓ | P1R1 | |
| 85 | | | | P2R1 | |
| 86 | | | | P3R1 | |
| 87 | | | | P0R2 | |
| 88 | | | | P1R2 | |
| 89 | | | | P2R2 | |
| 90 | | | | P3R2 | |
| 91 | | | | P0R3 | |
| 92 | | | | P1R3 | |
| 93 | | | | P2R3 | |
| 94 | | | | P3R3 | |
| ... | | | | ... | |

Ⓐ  Ⓑ

To Buffer 0

FIGURE 8 (cont.)

ered bufferhavealreadybeen operated on
BUFFERING DESERIALIZED PIXEL DATA IN A GRAPHICS PROCESSOR UNIT PIPELINE

RELATED U.S. APPLICATIONS

This application is related to U.S. patent application Ser. No. 11/893,622 by T. Bergland et al., filed on Aug. 15, 2007, entitled "Shared Readable and Writeable Global Values in a Graphics Processor Unit Pipeline," assigned to the assignee of the present invention, and hereby incorporated by reference in its entirety.

This application is related to U.S. patent application Ser. No. 11/893,620 by T. Bergland et al., filed on Aug. 15, 2007, entitled "A Conditional Execute Bit in a Graphics Processor Unit Pipeline," assigned to the assignee of the present invention, and hereby incorporated by reference in its entirety.

FIELD

Embodiments of the present invention generally relate to computer graphics.

BACKGROUND

Recent advances in computer performance have enabled graphics systems to provide more realistic graphical images using personal computers, home video game computers, handheld devices, and the like. In such graphics systems, a number of procedures are executed to render or draw graphics primitives to the screen of the system. A graphics primitive is a basic component of a graphic, such as a point, line, polygon, or the like. Rendered images are formed with combinations of these graphics primitives. Many procedures may be utilized to perform three-dimensional (3-D) graphics rendering.

Specialized graphics processing units (GPUs) have been developed to increase the speed at which graphics rendering procedures are executed. The GPUs typically incorporate one or more rendering pipelines. Each pipeline includes a number of hardware-based functional units that are designed for high-speed execution of graphics instructions/data. Generally, the instructions/data are fed into the front end of a pipeline and the computed results emerge at the back end of a pipeline. The hardware-based functional units, cache memories, firmware, and the like, of the GPUs are designed to operate on the basic graphics primitives and produce real-time rendered 3-D images.

There is increasing interest in rendering 3-D graphical images in portable or handheld devices such as cell phones, personal digital assistants (PDAs), and other devices. However, portable or handheld devices generally have limitations relative to more full-sized devices such as desktop computers. For example, because portable devices are typically battery-powered, power consumption is a concern. Also, because of their smaller size, the space available inside portable devices is limited. The desire is to quickly perform realistic 3-D graphics rendering in a handheld device, within the limitations of such devices.

SUMMARY

Embodiments of the present invention provide methods and systems for quickly and efficiently processing data in a graphics processor unit pipeline, and are well-suited for use in a handheld device or other portable, battery-operated devices (as well as in other types of devices).

In one embodiment, an arithmetic logic stage in the pipeline includes a number of arithmetic logic units (ALUs) and at least one buffer that stores pixel data for a group of pixels (e.g., a quad of four pixels). Each clock cycle, the buffer stores one row of a series of rows of pixel data. Each row represents at least part of the pixel data associated with a particular pixel—there may be one or more rows of pixel data per pixel.

In one embodiment, the rows of pixel data associated with any pixel in the group of pixels are interleaved with the rows associated with each of the other pixels in the group. For example, for a pixel quad, the pixel data proceeds down the pipeline in the following order: the first row for a first pixel, the first row for a second pixel, the first row for a third pixel, the first row for a fourth pixel, the second row for the first pixel, the second row for the second pixel, the second row for the third pixel, the second row for the fourth pixel, and so on. By interleaving the rows of pixel data in this manner, stalls in the pipeline can be avoided and data throughput can be increased.

A deserializer deserializes the rows of pixel data before the pixel data is placed in the buffer. After the buffer accumulates all rows of pixel data for a pixel, then the pixel data for the pixel can be operated on by the ALUs. For example, once all of the rows of pixel data for the first pixel are accumulated, that data is available to be operated on by the ALUs.

In one embodiment, the arithmetic logic stage includes a second buffer and optionally a third buffer. The second buffer stores pixel data for a second group of pixels that arrived at the arithmetic logic stage before the pixel data for the first group mentioned above. The pixel data in the second buffer can be operated on by the ALUs while the first buffer is being loaded. The third buffer, if used, stores pixel data for a third group of pixels that arrived at the arithmetic logic stage before the pixel data for the first and second groups mentioned above. The third buffer holds pixel data that has already been operated on by the ALUs, and so that data can be drained from the third buffer, serialized and sent to the next stage in the pipeline. In general, in this embodiment, the ALUs draw pixel data from one buffer while another buffer is being loaded and a third buffer is being unloaded.

Two buffers may be used instead of three buffers. If two buffers are used, pixel data for the next group of pixels to be operated on by the ALUs is received at the front end of one of the buffers while pixel data for a previous group of pixels is drained from the bottom of that buffer, and the other buffer is used to store the pixel data that is being operated on by the ALUs. In general, in this embodiment, the ALUs draw pixel data from one buffer while another buffer is being loaded at one end and unloaded at the other end.

The use of two or three buffers as described above means that the pipeline is widened at the arithmetic logic stage. The width of the pipeline above and below the arithmetic logic stage accommodates one row of pixel data. However, the width of the pipeline at the arithmetic logic stage accommodates all the rows of pixel data for a given pixel. In one embodiment, there are up to four rows of pixel data per pixel. Thus, in one embodiment, the portion of the pipeline that handles pixel data (not including sideband information) is up to four times wider in the arithmetic logic stage than in other stages of the pipeline.

In one embodiment, the depth of the ALUs (the number of clock cycles it takes to process a row of pixel data) is equal to the number of pixels in a group of pixels, and the number of rows of pixel data is equal to the number of instructions per pixel group. Accordingly, data arrives into the arithmetic logic stage, is processed in that stage, and exits that stage at the same rate. Consequently, there are no stalls in the pipeline, nor are there bubbles or gaps between rows of data in the pipeline.

The wider pipeline at the arithmetic logic stage means that all the pixel data for a given pixel is available to the ALUs. Thus, for instance, there is more flexibility when it comes to performing arithmetic operations that rely on pixel data from different rows. In other words, embodiments of the present invention permit inter-row communication of pixel data at the ALUs.

The narrower width of the pipeline in the stages other than the arithmetic logic stage means less power and a smaller integrated circuit area are needed for those stages. Thus, embodiments of the present invention strike a balance between conserving power and reducing chip size while increasing performance.

These and other objects and advantages of the various embodiments of the present invention will be recognized by those of ordinary skill in the art after reading the following detailed description of the embodiments that are illustrated in the various drawing figures.

BRIEF DESCRIPTION OF THE DRAWINGS

The present invention is illustrated by way of example, and not by way of limitation, in the figures of the accompanying drawings and in which like reference numerals refer to similar elements.

FIG. 8 is a timing diagram showing the flow of data in an arithmetic logic unit according to one embodiment of the present invention.

DETAILED DESCRIPTION

Figure 1:
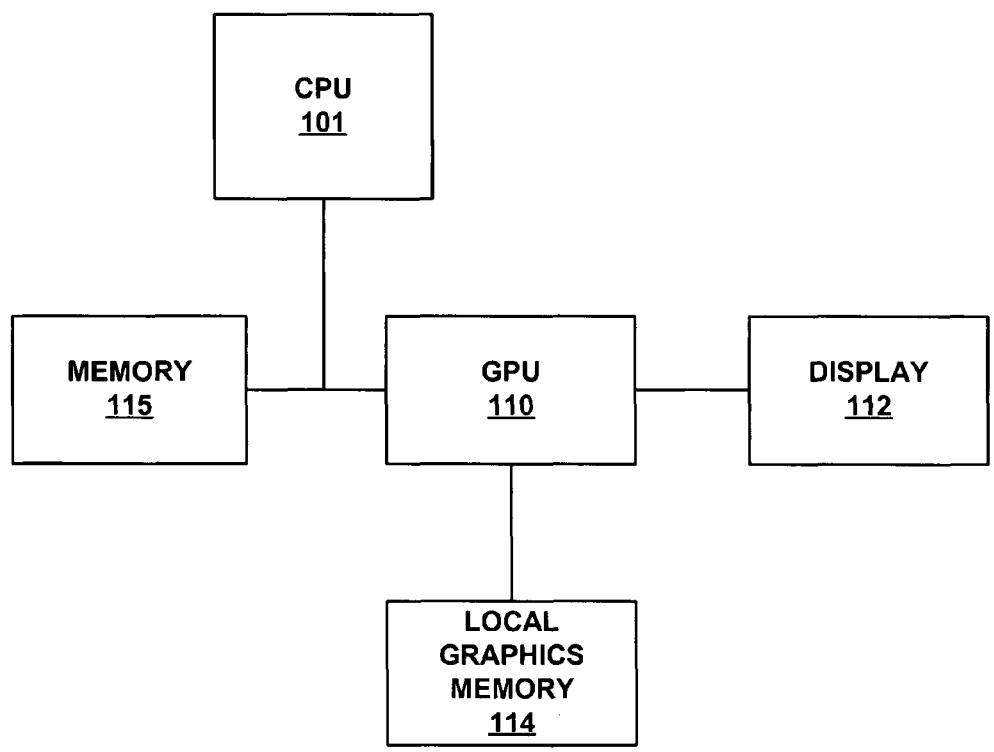
FIG. 1 is a block diagram showing components of a computer system in accordance with one embodiment of the present invention.

Reference will now be made in detail to embodiments of the present invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "storing" or "accumulating" or "deserializing" or "serializing" or "operating" or "removing" or "draining" or "performing" or the like, refer to the actions and processes of a computer system (e.g., computer system 100 of FIG. 1), or similar electronic computing device, that manipulates and transforms data represented as physical (electronic) quantities within the computer system's registers and memories into other data similarly represented as physical quantities within the computer system memories or registers or other such information storage, transmission or display devices.

FIG. 1 shows a computer system 100 in accordance with one embodiment of the present invention. The computer system includes the components of a basic computer system in accordance with embodiments of the present invention providing the execution platform for certain hardware-based and software-based functionality. In general, the computer system comprises at least one central processing unit (CPU) 101, a system memory 115, and at least one graphics processor unit (GPU) 110. The CPU can be coupled to the system memory via a bridge component/memory controller (not shown) or can be directly coupled to the system memory via a memory controller (not shown) internal to the CPU. The GPU is coupled to a display 112. One or more additional GPUs can optionally be coupled to system 100 to further increase its computational power. The GPU(s) is/are coupled to the CPU and the system memory. The computer system can be implemented as, for example, a desktop computer system or server computer system, having a powerful general-purpose CPU coupled to a dedicated graphics rendering GPU. In such an embodiment, components can be included that add peripheral buses, specialized graphics memory, input/output (I/O) devices, and the like. Similarly, computer system can be implemented as a handheld device (e.g., a cell phone, etc.) or a set-top video game console device.

The GPU can be implemented as a discrete component, a discrete graphics card designed to couple to the computer system via a connector (e.g., an Accelerated Graphics Port slot, a Peripheral Component Interconnect-Express slot, etc.), a discrete integrated circuit die (e.g., mounted directly on a motherboard), or an integrated GPU included within the integrated circuit die of a computer system chipset component (not shown) or within the integrated circuit die of a PSOC (programmable system-on-a-chip). Additionally, a local graphics memory 114 can be included for the GPU for high bandwidth graphics data storage.

Figure 2:
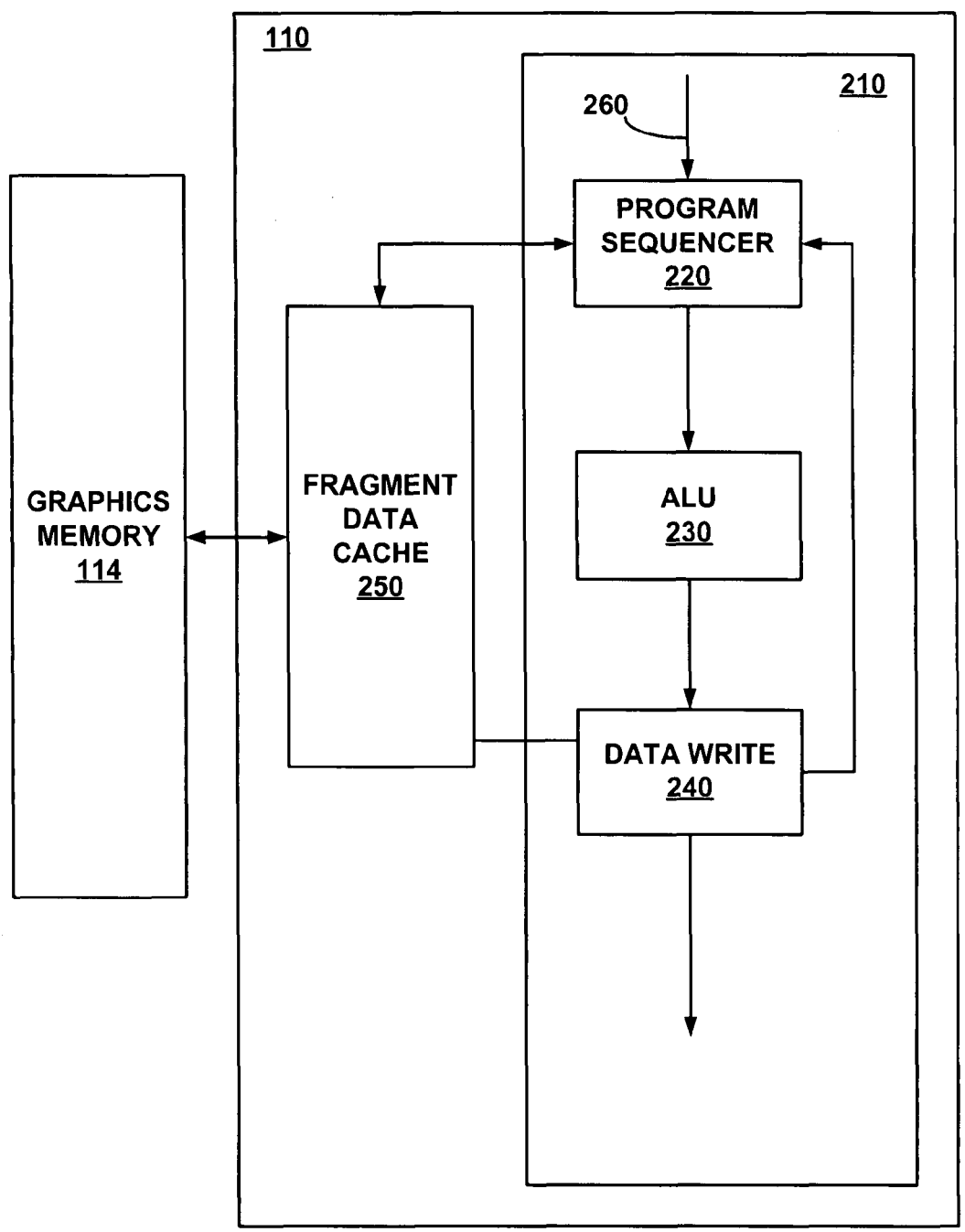
FIG. 2 is a block diagram showing components of a graphics processing unit (GPU) in accordance with one embodiment of the present invention.

FIG. 2 shows a diagram illustrating internal components of the GPU 110 and the graphics memory 114 in accordance with one embodiment of the present invention. As depicted in FIG. 2, the GPU includes a graphics pipeline 210 and a fragment data cache 250 which couples to the graphics memory as shown.

In the example of FIG. 2, a graphics pipeline 210 includes a number of functional modules. Three such functional modules of the graphics pipeline—for example, the program sequencer 220, the arithmetic logic stage (ALU) 230, and the data write component 240—function by rendering graphics primitives that are received from a graphics application (e.g., from a graphics driver, etc.). The functional modules 220-240 access information for rendering the pixels related to the graphics primitives via the fragment data cache 250. The fragment data cache functions as a high-speed cache for the information stored in the graphics memory (e.g., frame buffer memory).

The program sequencer functions by controlling the operation of the functional modules of the graphics pipeline. The program sequencer can interact with the graphics driver (e.g., a graphics driver executing on the CPU 101 of FIG. 1) to control the manner in which the functional modules of the graphics pipeline receive information, configure themselves for operation, and process graphics primitives. For example, in the FIG. 2 embodiment, graphics rendering data (e.g., primitives, triangle strips, etc.), pipeline configuration information (e.g., mode settings, rendering profiles, etc.), and rendering programs (e.g., pixel shader programs, vertex shader programs, etc.) are received by the graphics pipeline over a common input 260 from an upstream functional module (e.g., from an upstream raster module, from a setup module, or from the graphics driver). The input 260 functions as the main fragment data pathway, or pipeline, between the functional modules of the graphics pipeline. Primitives are generally received at the front end of the pipeline and are progressively rendered into resulting rendered pixel data as they proceed from one module to the next along the pipeline.

In one embodiment, data proceeds between the functional modules 220-240 in a packet-based format. For example, the graphics driver transmits data to the GPU in the form of data packets, or pixel packets, that are specifically configured to interface with and be transmitted along the fragment pipe communications pathways of the pipeline. A pixel packet generally includes information regarding a group or tile of pixels (e.g., four pixels, eight pixels, 16 pixels, etc.) and coverage information for one or more primitives that relate to the pixels. A pixel packet can also include sideband information that enables the functional modules of the pipeline to configure themselves for rendering operations. For example, a pixel packet can include configuration bits, instructions, functional module addresses, etc., that can be used by one or more of the functional modules of the pipeline to configure itself for the current rendering mode, or the like. In addition to pixel rendering information and functional module configuration information, pixel packets can include shader program instructions that program the functional modules of the pipeline to execute shader processing on the pixels. For example, the instructions comprising a shader program can be transmitted down the graphics pipeline and be loaded by one or more designated functional modules. Once loaded, during rendering operations, the functional module can execute the shader program on the pixel data to achieve the desired rendering effect.

In this manner, the highly optimized and efficient fragment pipe communications pathway implemented by the functional modules of the graphics pipeline can be used not only to transmit pixel data between the functional modules (e.g., modules 220-240), but to also transmit configuration information and shader program instructions between the functional modules.

Figure 3:
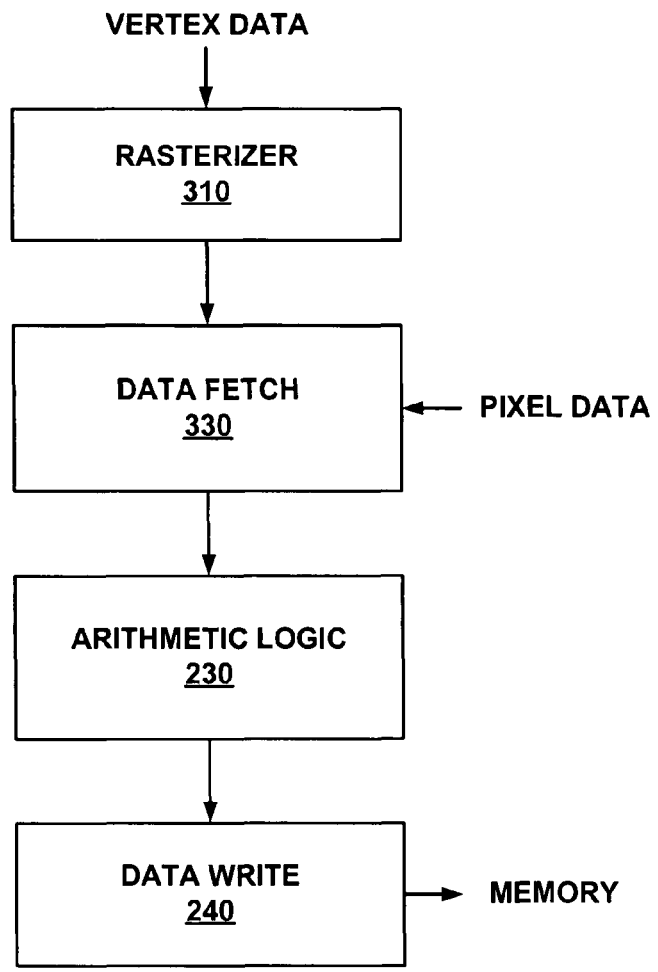
FIG. 3 illustrates stages in a GPU pipeline according to one embodiment of the present invention.

FIG. 3 is a block diagram showing selected stages in a graphics pipeline 210 according to one embodiment of the present invention. A graphics pipeline may include additional stages or it may be arranged differently than the example of FIG. 3. In other words, although the present invention is discussed in the context of the pipeline of FIG. 3, the present invention is not so limited.

In the example of FIG. 3, the rasterizer 310 translates triangles to pixels using interpolation. Among its various functions, the rasterizer receives vertex data, determines which pixels correspond to which triangle, and determines shader processing operations that need to be performed on a pixel as part of the rendering, such as color, texture, and fog operations.

The rasterizer generates a pixel packet for each pixel of a triangle that is to be processed. A pixel packet is, in general, a set of descriptions used for calculating an instance of a pixel value for a pixel in a frame of a graphical display. A pixel packet is associated with each pixel in each frame. Each pixel is associated with a particular (x,y) location in screen coordinates. In one embodiment, the graphics system renders a two pixel-by-two pixel region of a display screen, referred to as a quad.

Each pixel packet includes a payload of pixel attributes required for processing (e.g., color, texture, depth, fog, x and y locations, etc.) and sideband information (pixel attribute data is provided by the data fetch stage 330). A pixel packet may contain one row of data or it may contain multiple rows of data. A row is generally the width of the data portion of the pipeline bus.

The data fetch stage fetches data for pixel packets. Such data may include color information, any depth information, and any texture information for each pixel packet. Fetched data is placed into an appropriate field, which may be referred to herein as a register, in a row of pixel data prior to sending the pixel packet on to the next stage.

Figure 5:
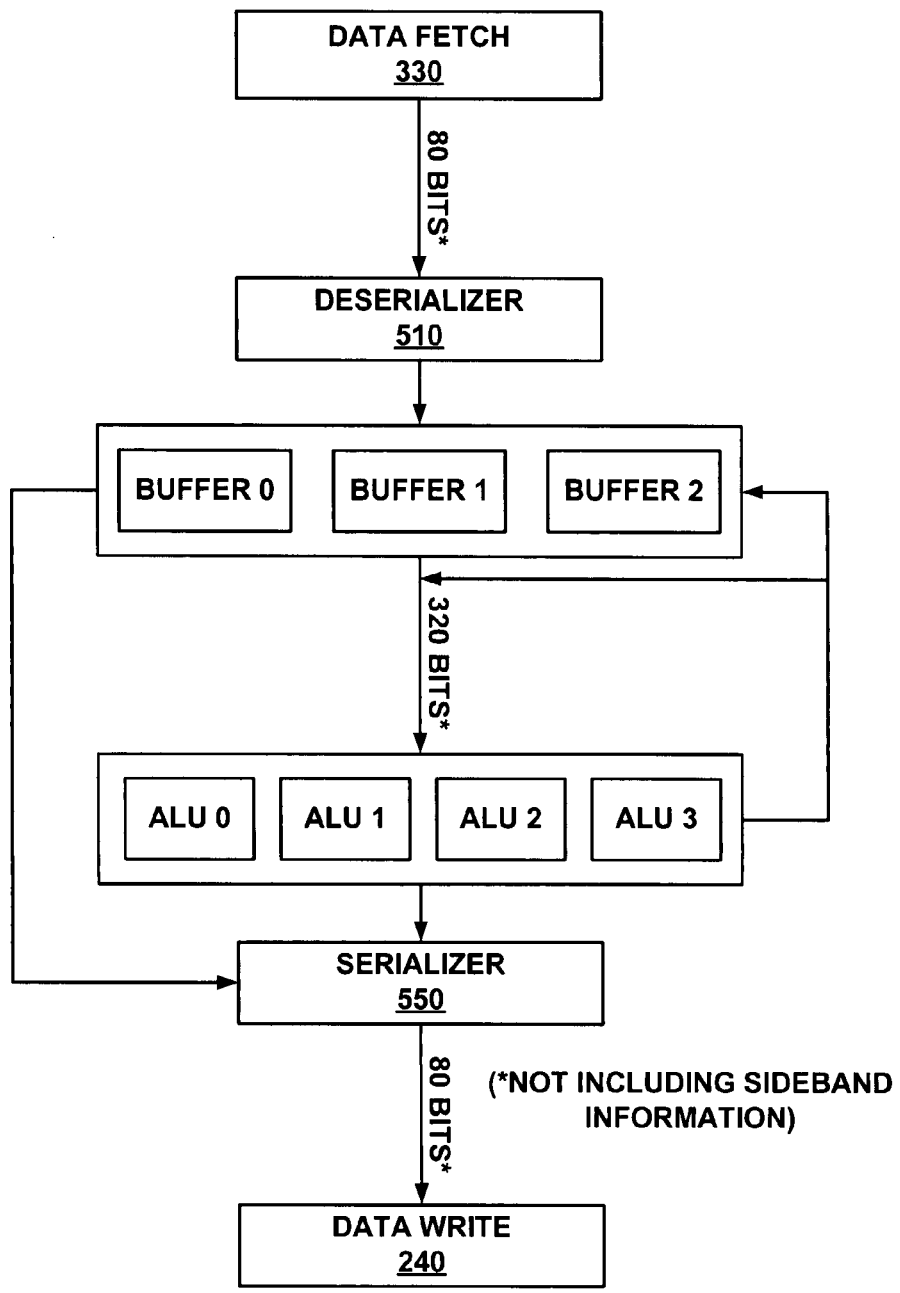
FIG. 5 is a block diagram of an arithmetic logic stage in a GPU according to one embodiment of the present invention.

From the data fetch stage, rows of pixel data enter the arithmetic logic stage 230. In the present embodiment, one row of pixel data enters the arithmetic logic stage each clock cycle. In one embodiment, the arithmetic logic stage includes multiple ALUs 0, 1, 2 and 3 (FIG. 5). Each ALU executes an instruction per clock cycle, each instruction for performing an arithmetic operation on operands that correspond to the contents of the pixel packets.

The output of the arithmetic logic stage goes to the data write stage. The data write stage stores pipeline results in a write buffer or in a framebuffer in memory (e.g., graphics memory 114 or memory 115 of FIGS. 1 and 2). Optionally, pixel packets/data can be recirculated from the data write stage back to the arithmetic logic stage if further processing of the data is needed.

Figure 4:
FIG. 4 illustrates a series of rows of pixel data according to an embodiment of the present invention.

FIG. 4 illustrates a succession of pixel data—that is, a series of rows of pixel data—for a group of pixels according to an embodiment of the present invention. In the example of FIG. 4, the group of pixels comprises a quad of four pixels: P0, P1, P2 and P3. As mentioned above, the pixel data for a pixel can be separated into subsets or rows of data. In one embodiment, there may be up to four rows of data per pixel. In one embodiment, the data portion of each row holds up to 80 bits of pixel data. In one such embodiment, the pixel data in each row is represented using four fields or registers of 20-bit values. For example, row 0 includes four fields or registers of pixel data P0r0, P0r1, P0r2 and P0r3, each 20 bits in length ("r" designates a field or register in a row, and "R" designates a row). Each of the rows of 20-bit values may represent one or more attributes of the pixel data. These attributes include, but are not limited to, z-depth values, texture coordinates, level of detail, color, and alpha. The register values can be used as operands in operations executed by the ALUs in the arithmetic logic stage.

Sideband information 420 is associated with each row of pixel data. In one embodiment, the sideband information includes 16 bits per row. The sideband information includes, among other things, information that identifies or points to an instruction that is to be executed by an ALU using the pixel data identified by the instruction. In other words, the sideband information associated with row 0 identifies, among other things, an instruction I0. An instruction can specify, for example, the type of arithmetic operation to be performed and which registers contain the data that is to be used as operands in the operation.

FIG. 5 is a block diagram of the arithmetic logic stage 230 according to one embodiment of the present invention. Only certain elements are shown in FIG. 5; the arithmetic logic stage may include elements in addition to those shown in FIG. 5 and described below.

With each new clock cycle, a row of pixel data proceeds in succession from the data fetch stage to the arithmetic logic stage of the pipeline. For example, row 0 proceeds down the pipeline on a first clock, followed by row 1 on the next clock, and so on. Once all of the rows associated with a particular group of pixels (e.g., a quad) are loaded into the pipeline, rows associated with the next quad can begin to be loaded into the pipeline.

In one embodiment, rows of pixel data for each pixel in a group of pixels (e.g., a quad) are interleaved with rows of pixel data for the other pixels in the group. For example, for a group of four pixels, with four rows per pixel, the pixel data proceeds down the pipeline in the following order: the first row for the first pixel (P0r0 through P0r3), the first row for the second pixel (P1r0 through P1r3), the first row for the third pixel (P2r0 through P2r3), the first row for the fourth pixel (P3r0 through P3r3), the second row for the first pixel (P0r4 through P0r7), the second row for the second pixel (P1r4 through P1r7), the second row for the third pixel (P2r4 through P2r7), the second row for the fourth pixel (P3r4 through P3r7), and so on to the fifteenth row, which includes P3r12 through P3r15. As mentioned above, there may be less than four rows per pixel. By interleaving rows of pixel packets in this fashion, stalls in the pipeline can be avoided, and data throughput can be increased. Refer also to FIG. 8, discussed below.

Thus, in the present embodiment, a row of pixel data (e.g., row 0) including sideband information 420 is delivered to the deserializer 510 each clock cycle. In the example of FIG. 5, the deserializer deserializes the rows of pixel data. As described above, the pixel data for a group of pixels (e.g., a quad) may be interleaved row-by-row. Also, the pixel data arrives at the arithmetic logic stage row-by-row. Thus, deserialization, as referred to herein, is not performed bit-by-bit; instead, deserialization is performed row-by-row. If the graphics pipeline is four registers wide, and there are four rows per pixel, then the deserializer deserializes the pixel data into 16 registers per pixel.

In the example of FIG. 5, the deserializer sends the pixel data for a group of pixels to one of the buffers 0, 1 or 2. If there are four pixels per group and 20 bits per register, then a buffer can hold 16 registers per pixel times four pixels times 20 bits per register.

Pixel data is sent to one of the buffers while the pixel data in one of the other buffers is operated on by the ALUs, while the pixel data in the remaining buffer, having already been operated on by the ALUs, is serialized by the serializer 550 and fed, row-by-row, to the next stage of the graphics pipeline. Once a buffer is drained, it is ready to be filled (overwritten) with pixel data for the next group of pixels; once a buffer has been loaded, the pixel data it contains is ready to be operated on; and once the pixel data in a buffer has been operated on, it is ready to be drained (overwritten).

The width of the pipeline above, as well as below, the arithmetic logic stage accommodates one row of pixel data per clock cycle. However, the pipeline at the arithmetic logic stage is wide enough to accommodate all the rows of pixel data for a given pixel. In one embodiment, there are up to four rows of pixel data per pixel. In the example of FIG. 5, the bus that feeds the deserializer accommodates up to 80 bits of pixel data (not including the sideband information), the bus that connects the buffers to the ALUs can accommodate up to 320 bits of pixel data, and the bus that is fed by the serializer accommodates up to 80 bits of pixel data. Thus, the portion of the pipeline that handles pixel data (not including the sideband information) is up to four times wider in the arithmetic logic stage than in other stages of the pipeline.

Figure 6:
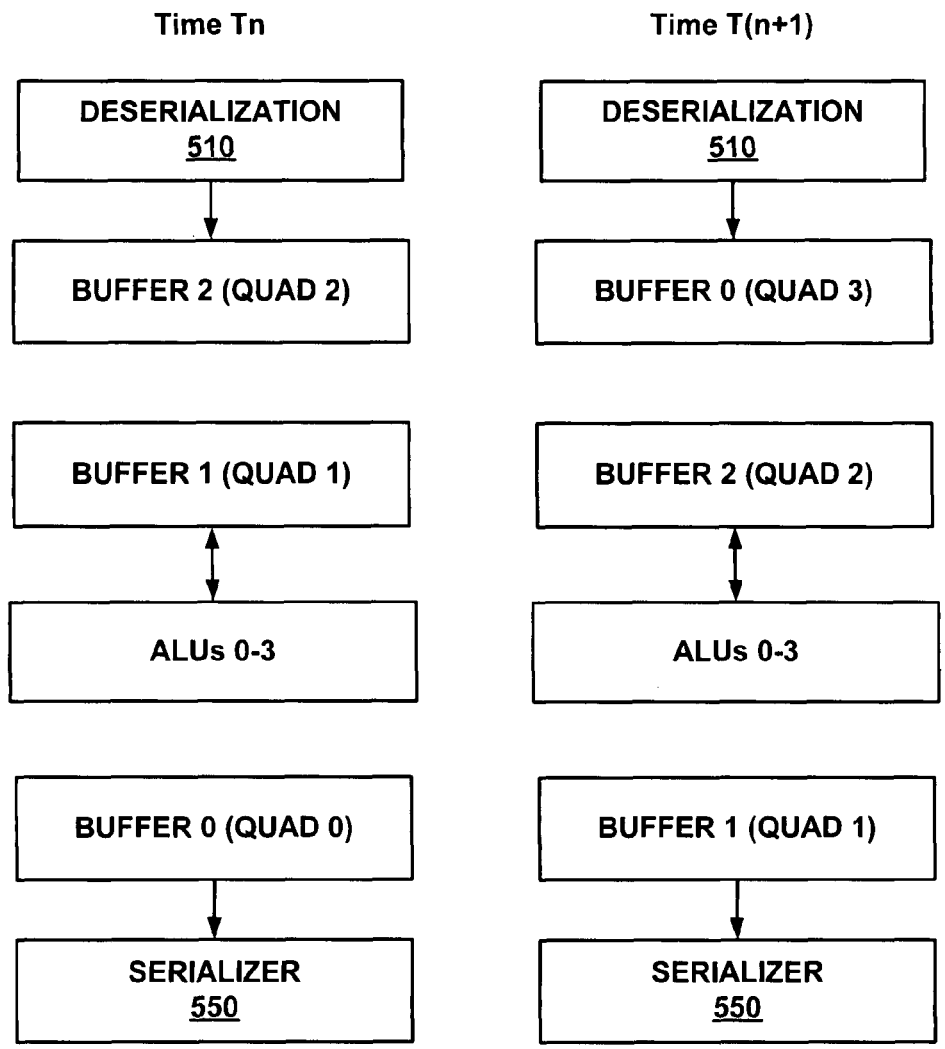
FIG. 6 is a block diagram illustrating the use of three buffers in an arithmetic logic stage according to one embodiment of the present invention.

Pixel data including sideband information for a group of pixels (e.g., quad 0) arrives at the arithmetic logic stage, followed by pixel data including sideband information for the next group of pixels (e.g., quad 1), which is followed by the pixel data including sideband information for the next group of pixels (e.g., quad 2). With reference to FIG. 6, at arbitrary time Tn, the ALUs have finished operating on the pixel data for quad 0 and are ready to begin operating on the pixel data for quad 1, and the pixel data for quad 2 is beginning to arrive. Thus, at time Tn, the ALUs can start to operate on the data in buffer 1; buffer 2 can begin to accumulate pixel data from the deserializer; and the pixel data in buffer 0 can be removed and serialized by the serializer. Time T(n+1) is separated from time Tn by some number of clock cycles. At time T(n+1), the pixel data for quad 0 has been completely removed from buffer 0, and so buffer 0 can start to accumulate pixel data for another group of pixels (e.g., quad 3, which follows the pixel data for quad 2 in the pipeline); the pixel data in buffer 2 can be operated on by the ALUs; and the pixel data in buffer 1 can be removed and serialized by the serializer.

Actually, once all of the rows of pixel data associated with a particular pixel have been deserialized, the pixel data for that pixel can be operated on by the ALUs. In other words, considering the example of FIG. 6, it is not necessary to wait for all of the pixel data for quad 2 to be buffered in buffer 0 before beginning the ALU operations on that data. Instead, once all of the rows of data for pixel P0 in quad 2 have been buffered, for example, then the ALUs can begin operating on the pixel data for pixel P0, even though all of the rows of data for other pixels in quad 2 have not yet arrived. Then, once all of the rows of data for pixel P1 in quad 2 have been buffered, then the ALUs can operate on the pixel data for pixel P1, and so on. This is illustrated in FIG. 8, below.

Figure 7:
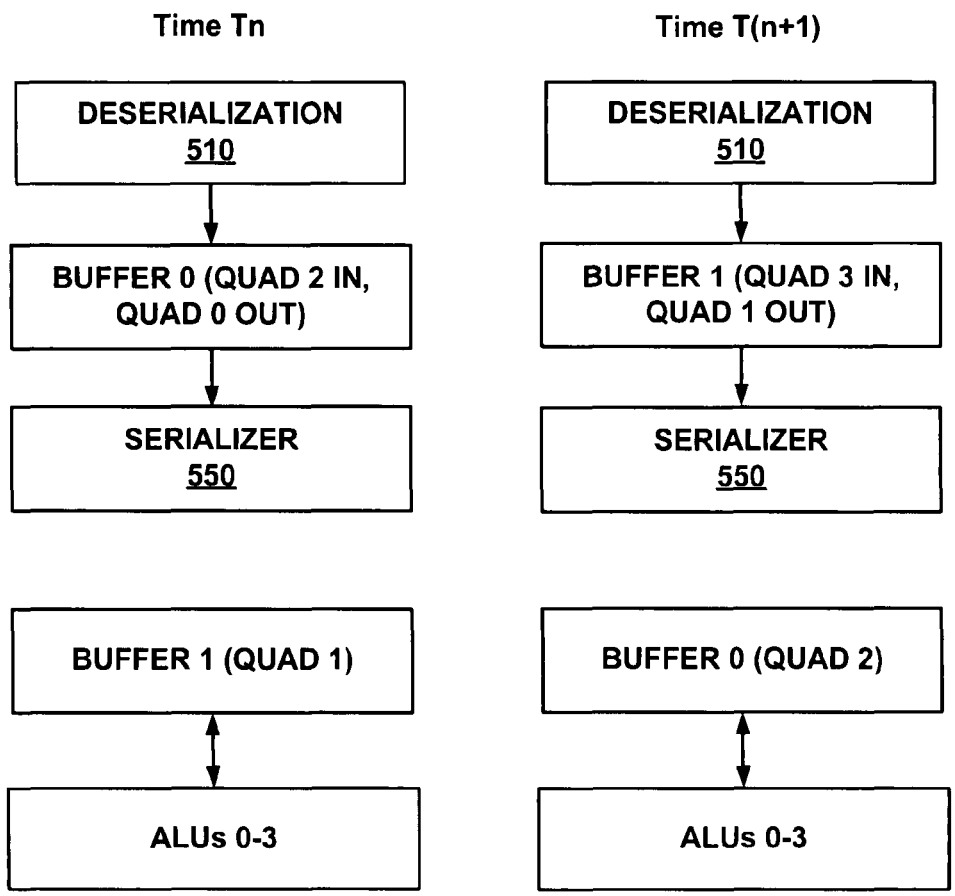
FIG. 7 is a block diagram illustrating the use of two buffers in an arithmetic logic stage according to one embodiment of the present invention.

FIG. 7 illustrates an example in which two buffers are used instead of three buffers. At arbitrary time Tn, the ALUs have finished operating on the pixel data for quad 0 and are ready to begin operating on the pixel data for quad 1, and the pixel data for quad 2 is beginning to arrive. Thus, at time Tn, the ALUs can start to operate on the data in buffer 1; and buffer 0 can begin to accumulate pixel data for quad 2 from the deserializer at the front end while the pixel data for quad 0 is removed from the back end of buffer 0 and sent to the serializer. In a similar fashion, at time T(n+1), the ALUs can start to operate on the data in buffer 0; and buffer 1 can begin to accumulate pixel data for quad 3 from the deserializer at the front end while the pixel data for quad 1 is removed from the back end of buffer 1 and sent to the serializer. As in the example of FIG. 6, once all of the rows of pixel data associated with a particular pixel have been deserialized, the pixel data for that pixel can be operated on by the ALUs.

FIG. 8 is a timing diagram showing the flow of pixel data in an arithmetic logic stage that includes three buffers and four ALUs, and in which it takes four cycles for a row of data to be operated on in an ALU—each ALU has a depth of four cycles. In FIG. 8, "R" designates a row number.

With reference to the column labeled "Deser," in clock cycles 1-16, rows of pixel data for a first quad of pixels (quad 0) are deserialized and placed in buffer 0. In clock cycles 17-32, rows of pixel data for a second quad of pixels (quad 1) are deserialized and placed in buffer 1, and in clock cycles 33-48, rows of pixel data for a third quad of pixels (quad 2) are deserialized and placed in buffer 2. As mentioned above, the rows of pixel data within each quad are interleaved. The rows of pixel data are deserialized and placed in a respective buffer; however, the interleaving of rows of pixel data is maintained as the data passes through the arithmetic logic stage, which is illustrated in the columns labeled "ALUIN" and "ALUOUT."

At clock cycle 13, all the rows (rows 0-3) of pixel data for a first pixel (pixel P0) in quad 0 have been received into buffer 0. Accordingly, with reference to the column labeled "ALUIN," at clock 14, the pixel data for pixel P0 can be operated on by the ALUs. Similarly, at clock 14, all the rows (rows 0-3) of pixel data for a second pixel (pixel 1) in quad 0 have been received into buffer 0. Accordingly, at clock 15, the pixel data for pixel P1 can be operated on by the ALUs. Other rows of pixel data for other pixels in quad 0 are similarly described.

As mentioned above, in the present embodiment, it takes four clock cycles for a row of pixel data to be operated on—more specifically, for an instruction to be executed by the ALUs. During the first clock cycle, pixel data is read into the ALU—that is, the pixel data to be used as operands are loaded into an ALU. During the second and third clock cycles, computations are performed—for example, in the second clock cycle, operands may be multiplied in a multiplier, and in the third clock cycle, multiplier results may be added in an adder. During the fourth clock cycle, pixel data is written back to its respective buffer.

Thus, in the example of FIG. 8, with reference to the column labeled "ALUOUT," at clock cycle 18, ALU operations associated with the execution of the instruction associated with pixel P0 (e.g., P0R0) have been completed. At clock cycle 30, all of the ALU operations that rely on the pixel data for pixel P0 have been completed. Accordingly, with reference to the column labeled "Ser," the pixel data for pixel P0 can be sent to the serializer. At clock 48, all of the data for quad 0 in buffer 0 has been serialized, and so buffer 0 can now start receiving pixel data for the quad that follows quad 2 in the pipeline.

The data for each pixel in buffer 0, and in buffers 1 and 2, is processed in the arithmetic logic stage in a fashion similar to that just described.

Note that, in the examples above, the depth of the ALUs is equal to the number of pixels in a group of pixels. Also, the number of rows of pixel data is equal to the number of instructions per pixel group. Accordingly, data can arrive into the arithmetic logic stage, be processed in that stage, and exit that stage at the same rate. Consequently, there are no stalls in the pipeline, nor are there bubbles or gaps between rows of data in the pipeline.

Figure 9:
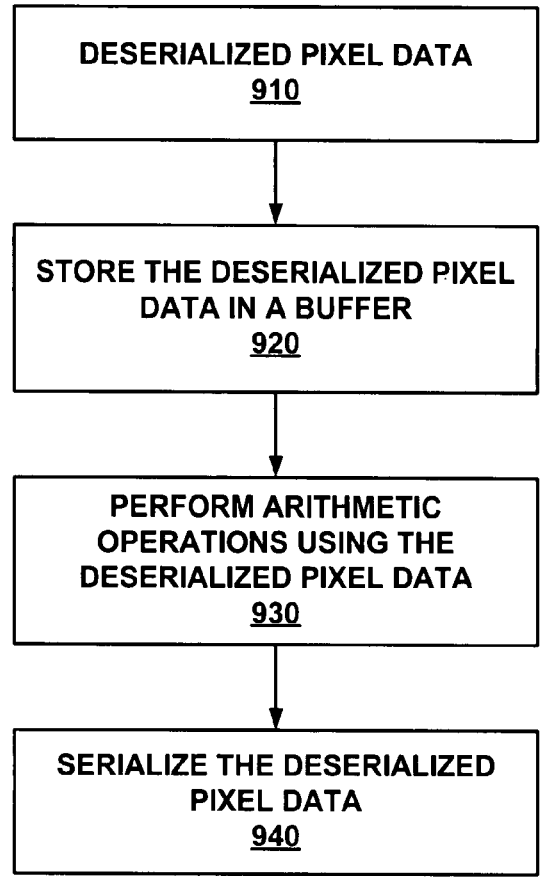
FIG. 9 is a flowchart of a computer-implemented method for processing pixel data according to one embodiment of the present invention.

FIG. 9 is a flowchart 900 of an example of a computer-implemented method for processing pixel data in a graphics processor unit pipeline according to one embodiment of the present invention. Although specific steps are disclosed in the flowchart, such steps are exemplary. That is, embodiments of the present invention are well-suited to performing various other steps or variations of the steps recited in the flowchart. The steps in the flowchart may be performed in an order different than presented.

In block 910, serialized subsets of pixel data (e.g., rows of pixel data and, in one embodiment, interleaved rows of pixel data) are deserialized. Each of the subsets includes one row of pixel data associated with a first group of pixels (e.g., a quad).

In block 920, the deserialized pixel data for the first group of pixels is stored in a first buffer.

In block 930, after all of the deserialized pixel data for a first pixel in the first group of pixels is received in the first buffer, arithmetic operations can be performed using the deserialized pixel data for the first pixel. Once all the pixel data for other pixels in the first group is subsequently deserialized and stored in the first buffer, arithmetic operations can be performed using the deserialized pixel data for each of those pixels.

In block 940, once the arithmetic operations using the deserialized pixel data for the first pixel are completed, the pixel data for the first pixel can be serialized and forwarded to the next stage of the graphics pipeline. Each subsequent pixel in the group is treated similarly. Blocks 910-940 are repeated for each subsequent group of pixels (e.g., for each quad).

Furthermore, while the first buffer accumulates the deserialized pixel data for the aforementioned first group of pixels, arithmetic operations can be performed using deserialized pixel data for a second group of pixels and stored in a second buffer (the pixel data for the second group of pixels preceded the pixel data for the first group of pixels down the graphics pipeline).

Also, while the first buffer accumulates the deserialized pixel data for the aforementioned first group of pixels, deserialized pixel data for a third group of pixels can be drained from a third buffer (the pixel data for the third group of pixels preceded the pixel data for the first and second groups down the graphics pipeline).

In summary, embodiments of the present invention provide methods and systems for quickly and efficiently processing data in a GPU pipeline, and are well-suited for use in a handheld device or other portable, battery-operated devices (as well as in other types of devices). Multiple buffers can be used to widen a graphics pipeline at the arithmetic logic stage. The width of the pipeline above and below the arithmetic logic stage accommodates one row of pixel data. The wider pipeline at the arithmetic logic stage means that all the pixel data for a given pixel is available to the ALUs. Thus, for instance, there is more flexibility when it comes to performing arithmetic operations that rely on pixel data from different rows.

The foregoing descriptions of specific embodiments of the present invention have been presented for purposes of illustration and description. They are not intended to be exhaustive or to limit the invention to the precise forms disclosed, and many modifications and variations are possible in light of the above teaching. For example, embodiments of the present invention can be implemented on GPUs that are different in form or function from the GPU 110 of FIG. 2. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A graphics pipeline in a graphics processor unit, the pipeline comprising:
    a plurality of arithmetic logic units (ALUs); and
    a first buffer coupled to the plurality of ALUs, wherein each clock cycle the first buffer stores a subset of pixel data comprising one row of a series of rows of pixel data associated with a first plurality of pixels, and wherein after the first buffer accumulates all rows of pixel data for a pixel of the first plurality, then the pixel data for the pixel operated on by the plurality of ALUs before all rows of pixel data for the remaining pixels in the first plurality are received into the first buffer.

2. The graphics pipeline of claim 1 further comprising a second buffer coupled to the plurality of ALUs and operable for storing pixel data for a second plurality of pixels that preceded the pixel data for the first plurality of pixels down the graphics pipeline, and wherein the plurality of ALUs operate on the pixel data for the second plurality of pixels while the first buffer accumulates the pixel data for the first plurality of pixels.

3. The graphics pipeline of claim 2 further comprising a third buffer coupled to the plurality of ALUs and operable for storing pixel data for a third plurality of pixels that preceded the pixel data for the first and second pluralities of pixels down the graphics pipeline, wherein further the pixel data for the third plurality of pixels is removed from the third buffer while the plurality of ALUs operate on the pixel data for the second plurality of pixels and while the pixel data for the first plurality of pixels is added to the first buffer.

4. The graphics pipeline of claim 1 wherein pixel data for another plurality of pixels is removed from the first buffer as the pixel data for the first plurality of pixels is added to the first buffer.

5. The graphics pipeline of claim 1 further comprising a serializer coupled to the first buffer and operable for serializing the pixel data after the ALUs are finished performing the arithmetic operations.

6. The graphics pipeline of claim 1 wherein rows of pixel data associated with any pixel in the first plurality of pixels are interleaved with rows of pixel data associated with any other pixel in the first plurality of pixels.

7. The graphics pipeline of claim 1 wherein the first plurality of pixels comprises a quad of pixels.

8. The graphics pipeline of claim 1 wherein the subset of pixel data further comprises sideband information that identifies an instruction, wherein the plurality of ALUs perform operations according to the instruction.

9. The graphics pipeline of claim 1 wherein the plurality of ALUs comprises four ALUs.

10. The graphics pipeline of claim 1 further comprising a first bus that carries the series of rows of pixel data toward the first buffer, and a second bus that carries the pixel data from the first buffer to the ALUs, wherein the second bus is wider than the first bus measured in number of bits.

11. A graphics pipeline in a graphics processor unit, the pipeline comprising:
    a data fetch stage having a first pipeline width measured in number of bits; and
    an arithmetic logic stage coupled to the data fetch stage and comprising a plurality of arithmetic logic units (ALUs), wherein the arithmetic logic unit has a second pipeline width measured in number of bits, wherein the second pipeline width is greater than the first pipeline width; and
    a first buffer coupled to the plurality of ALUs, wherein each clock cycle the first buffer stores a subset of pixel data comprising one row of a series of rows of pixel data associated with a first plurality of pixels, and wherein after the first buffer accumulates all rows of pixel data for a pixel of the first plurality, then the pixel data for the pixel is operated on by the plurality of ALUs while the first buffer accumulates the pixel data for the remaining pixels in the first plurality.

12. The graphics pipeline of claim 11 wherein the data fetch stage comprises a plurality of registers that are operable for storing a subset of pixel data comprising one row of a series of rows of pixel data for a pixel of a first plurality of pixels.

13. The graphics pipeline of claim 12 wherein rows of pixel data associated with any pixel in the first plurality of pixels are interleaved with rows of pixel data associated with any other pixel in the first plurality of pixels.

14. The graphics pipeline of claim 12 further comprising a second buffer coupled to the ALUs and operable for storing pixel data for a second plurality of pixels that preceded the pixel data for the first plurality of pixels down the graphics pipeline, and wherein the plurality of ALUs operate on the pixel data for the second plurality of pixels while the first buffer accumulates the pixel data for the first plurality of pixels.

15. The graphics pipeline of claim 14 further comprising a third buffer coupled to the ALUs and operable for storing pixel data for a third plurality of pixels that preceded the pixel data for the first and second pluralities of pixels down the graphics pipeline, wherein further the pixel data for the third plurality of pixels is removed from the third buffer while the plurality of ALUs operate on the pixel data for the second plurality of pixels and while the pixel data for the first plurality of pixels is added to the first buffer.

16. The graphics pipeline of claim 12 wherein pixel data for another plurality of pixels is removed from the first buffer as the pixel data for the first plurality of pixels is added to the first buffer.

17. The graphics pipeline of claim 11 wherein the arithmetic logic stage further comprises a serializer coupled to the first buffer and operable for serializing the pixel data after the ALUs are finished performing the arithmetic operations, wherein downstream of the serializer the graphics pipeline has a width equivalent to the first pipeline width.

18. A computer-implemented method of processing pixel data in a graphics processor unit pipeline, the method comprising:
    deserializing serialized subsets of interleaved pixel data to produce a first plurality of deserialized and interleaved pixel data, each of the subsets comprising one row of pixel data associated with a first plurality of pixels, wherein rows of pixel data associated with any pixel in the first plurality of pixels are interleaved with rows of pixel data associated with any other pixel in the first plurality of pixels;
    storing the first plurality of deserialized and interleaved pixel data for the first plurality of pixels in a first buffer;
    after all pixel data for a first pixel in the first plurality of pixels is received in the first buffer, performing arithmetic operations using the pixel data for the first pixel before all rows of pixel data for the remaining pixels in the first plurality are received into the first buffer; and serializing the pixel data for the first pixel after the arithmetic operations are performed.

19. The method of claim 18 further comprising, while the first buffer accumulates the first plurality of deserialized and interleaved pixel data, performing arithmetic operations using a second plurality of deserialized and interleaved pixel data stored in a second buffer, wherein the second plurality of deserialized and interleaved pixel data comprises subsets of pixel data for a second plurality of pixels that preceded the pixel data for the first plurality down the graphics pipeline.

20. The method of claim 18 further comprising, while the first buffer accumulates the first plurality of deserialized and interleaved pixel data, draining a third plurality of pixel data from a third buffer, wherein the third plurality of pixel data comprises subsets of pixel data for a third plurality of pixels that preceded the pixel data for the first plurality down the graphics pipeline.

* * * * *